UNITED STATES PATENT OFFICE.

CHASE A. STEVENS, OF NEW YORK, N. Y., ASSIGNOR TO ABIJAH RICHARDSON, OF BOSTON, MASSACHUSETTS.

IMPROVEMENT IN TREATING ASBESTUS AND OTHER FIBROUS MINERALS.

Specification forming part of Letters Patent No. 112,650, dated March 14, 1871.

*To all whom it may concern:*

Be it known that I, CHASE A. STEVENS, of the city of New York, in the county and State of New York, have invented a new and Improved Process for Treatment of Mineral Fiber and Making Liquid Sand; and I do hereby declare that the following is a full, clear, and exact description thereof, which will enable others skilled in the art to make and use the same.

This invention relates to an improved process for extracting, eliminating, or expelling the silex and all earthy matter from the fibrous minerals known as asbestus, amianthus, hornblende, and similar minerals, and for converting the silex into a liquid form, and also for the manufacture of said liquid from sand.

I first take the crude or natural mineral and place it in a large tank or converter, the lower part of which is supplied with a movable bottom, about one foot from the bottom of the tank, perforated with a number of holes.

In the bottom of the tank or converter I place a quantity of fluoride of calcium, powdered, or fluorate of lime. With this I mix a quantity of sulphuric acid, sufficient to saturate the substances. Over this the vessel is then filled with the mineral, and heat applied to it, usually by flame at the bottom of the converter, sufficient to produce the escape of gas.

The fluorine gas passes up through the main body of the tank, which is filled with the said asbestus, amianthus, &c., in its natural or crude condition; and by the operation of the fluorine gas passing through the same the silex and earthy matters are dissolved and carried off in a gaseous form, so that the substantial fibers are left loose, clean, flexible, fine, and flocky, like prepared cotton, wool, or flax. When in this condition the said fibrous minerals are of commercial value, and prepared in a proper condition for the manufacture of packing for steam and caloric engines, water and acid pumps; also, for the manufacture of paper, yarn, cloth, &c.

Instead of the fluorine gas I may also treat the said substances in like manner with hydrofluoric-acid gas, or any other combination of fluorine, with like effects.

The silex thus dissolved and vaporized by the action of fluorine gas is carried over in lead pipes into "Wolff's" bottles, or any equivalent condenser, and, being condensed, assumes a liquid form, in which condition it is useful for various purposes, being free from those substances with which silicate of soda or soluble glass is mixed when made from silex or sand.

The mineral fiber thus produced, being capable of resisting completely the action of the fluorine gas, I have found to be excellent means for holding sand in a loose and free condition to admit of the action of said gas for dissolving and vaporizing it, and I therefore propose to utilize it for the manufacture of liquid sand by charging the retort or converter containing the fiber with sand, to be subjected in this way to the action of the fluorine gas, which may be kept in action as long after the disintegration of the fiber is accomplished as may be required.

Having thus described my invention, I claim as new and desire to secure by Letters Patent—

1. The herein-described process for the treatment of asbestus, amianthus, hornblende, and other fibrous minerals with fluorine gas or hydrofluoric-acid gas for eliminating the silex and other foreign matters, and producing a pure fibrous condition of said minerals.

2. The process of treating silex or silicates with fluorine or hydrofluoric acid, fibrous mineral substances, as and for the purpose set forth.

CHASE A. STEVENS.

Witnesses:
GEO. W. MABEE,
ALEX. F. ROBERTS.